(12) United States Patent
Huang et al.

(10) Patent No.: US 10,891,950 B2
(45) Date of Patent: Jan. 12, 2021

(54) GRAPH BASED PREDICTION FOR NEXT ACTION IN CONVERSATION FLOW

(71) Applicant: International Business Machines Corporation, Armonk, NY (US)

(72) Inventors: Lei Huang, Mountain View, CA (US); Robert J. Moore, San Jose, CA (US); Guangjie Ren, Belmont, CA (US); Shun Jiang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 16/144,977

(22) Filed: Sep. 27, 2018

(65) Prior Publication Data

US 2020/0105255 A1   Apr. 2, 2020

(51) Int. Cl.
*G10L 15/22* (2006.01)
*G06F 16/332* (2019.01)
*G06F 16/33* (2019.01)

(52) U.S. Cl.
CPC .......... *G10L 15/22* (2013.01); *G06F 16/3329* (2019.01); *G06F 16/3334* (2019.01); *G10L 2015/225* (2013.01)

(58) Field of Classification Search
None
See application file for complete search history.

(56) References Cited

U.S. PATENT DOCUMENTS

| | | | |
|---|---|---|---|
| 7,539,656 B2 | 5/2009 | Fratkina et al. | |
| 7,617,094 B2 | 11/2009 | Aoki et al. | |
| 7,792,136 B2 | 9/2010 | Koski | |
| 8,126,705 B2 | 2/2012 | Aoki et al. | |
| 8,638,908 B2 | 1/2014 | Leeds et al. | |
| 8,639,517 B2 | 1/2014 | Di Fabbrizio et al. | |
| 8,676,572 B2 | 3/2014 | Aoki et al. | |
| 8,819,150 B1 | 8/2014 | Osinga et al. | |
| 8,825,776 B1 | 9/2014 | Osinga et al. | |
| 9,105,042 B2 | 8/2015 | Sylves | |
| 9,177,318 B2 | 11/2015 | Shen et al. | |

(Continued)

FOREIGN PATENT DOCUMENTS

WO    2007079219 A2    7/2007

OTHER PUBLICATIONS

Lison P. Multi-policy dialogue management. InProceedings of the SIGDIAL 2011 Conference Jun. 2011 (pp. 294-300). (Year: 2011).*

(Continued)

*Primary Examiner* — Jonathan C Kim
(74) *Attorney, Agent, or Firm* — Sherman IP LLP; Kenneth L. Sherman; Steven Laut

(57) ABSTRACT

One embodiment provides a method for predicting a next action in a conversation system that includes obtaining, by a processor, information from conversation logs and a conversation design. The processor further creates a dialog graph based on the conversation design. Weights and attributes for edges in the dialog graph are determined based on the information from the conversation logs. An unrecognized user input the conversation system is detected. The unrecognized user input is analyzed and a next action is predicted based on dialog nodes in the dialog graph and historical paths. A guiding conversation response is generated based on the predicted next action.

18 Claims, 19 Drawing Sheets

(56) References Cited

U.S. PATENT DOCUMENTS

| | | | |
|---|---|---|---|
| 9,195,645 B2 | 11/2015 | Grieves et al. | |
| 9,196,245 B2 | 11/2015 | Larcheveque et al. | |
| 9,223,537 B2 | 12/2015 | Brown et al. | |
| 9,412,377 B2 | 8/2016 | Aoki et al. | |
| 9,471,872 B2 | 10/2016 | Anand et al. | |
| 9,509,838 B2 | 11/2016 | Leeds | |
| 9,521,252 B2 | 12/2016 | Leeds et al. | |
| 9,602,456 B2 | 3/2017 | Buchheit et al. | |
| 9,621,713 B1 | 4/2017 | Gainsboro | |
| 9,641,681 B2 | 5/2017 | Nuta et al. | |
| 9,691,296 B2 | 6/2017 | Hoque et al. | |
| 9,704,175 B2 | 7/2017 | Moeinifar et al. | |
| 9,722,965 B2 | 8/2017 | Cecchi et al. | |
| 9,799,082 B1 | 10/2017 | Raskin et al. | |
| 9,904,669 B2 | 2/2018 | Gunaratna et al. | |
| 9,967,211 B2 | 5/2018 | Galley et al. | |
| 10,033,857 B2 | 7/2018 | Gainsboro et al. | |
| 10,069,971 B1 | 9/2018 | Shaw et al. | |
| 10,554,817 B1* | 2/2020 | Sullivan | G06N 5/02 |
| 2005/0246174 A1* | 11/2005 | DeGolia | H04L 41/082 704/270 |
| 2007/0225975 A1* | 9/2007 | Imoto | G10L 15/065 704/233 |
| 2014/0098948 A1* | 4/2014 | Kulkarni | H04L 43/50 379/265.03 |
| 2014/0249785 A1 | 9/2014 | Lospinoso et al. | |
| 2014/0365226 A1* | 12/2014 | Sinha | H04M 1/72519 704/275 |
| 2015/0142704 A1* | 5/2015 | London | G06N 5/022 706/11 |
| 2015/0256675 A1 | 5/2015 | Sri et al. | |
| 2016/0212073 A1* | 7/2016 | Kulkarni | H04L 51/04 |
| 2017/0048170 A1* | 2/2017 | Smullen | H04L 67/02 |
| 2017/0118336 A1* | 4/2017 | Tapuhi | H04M 3/4938 |
| 2017/0222961 A1 | 8/2017 | Beach et al. | |
| 2017/0270929 A1* | 9/2017 | Aleksic | G10L 15/26 |
| 2018/0060301 A1* | 3/2018 | Li | G06N 3/08 |
| 2018/0075847 A1 | 3/2018 | Lee et al. | |
| 2018/0090141 A1 | 3/2018 | Priorellis et al. | |
| 2018/0129484 A1 | 5/2018 | Kannan et al. | |
| 2018/0159889 A1* | 6/2018 | Sjouwerman | H04L 63/1433 |
| 2018/0173692 A1 | 6/2018 | Greenberg et al. | |
| 2018/0174055 A1 | 6/2018 | Tirumale et al. | |
| 2018/0189267 A1* | 7/2018 | Takiel | G06F 16/3329 |
| 2018/0212904 A1* | 7/2018 | Smullen | H04L 63/18 |
| 2018/0260680 A1* | 9/2018 | Finkelstein | G06N 3/006 |
| 2018/0293221 A1* | 10/2018 | Finkelstein | G06F 40/205 |
| 2018/0329998 A1* | 11/2018 | Thomson | H04N 21/41407 |
| 2018/0338041 A1* | 11/2018 | McGann | G06F 17/18 |
| 2019/0034484 A1* | 1/2019 | Das | G06N 3/08 |
| 2019/0058793 A1* | 2/2019 | Konig | H04M 3/5183 |
| 2019/0130904 A1* | 5/2019 | Homma | G10L 15/26 |
| 2019/0138879 A1* | 5/2019 | Hu | G06N 5/043 |
| 2019/0182382 A1* | 6/2019 | Mazza | G10L 15/26 |
| 2019/0197357 A1* | 6/2019 | Anderson | G06F 16/901 |
| 2019/0332667 A1* | 10/2019 | Williams | G06F 16/3329 |
| 2019/0355353 A1* | 11/2019 | Shin | G10L 15/22 |
| 2019/0378515 A1* | 12/2019 | Kim | G06F 40/35 |
| 2019/0392826 A1* | 12/2019 | Lee | G06F 40/30 |
| 2019/0392827 A1* | 12/2019 | Park | G10L 15/22 |
| 2020/0005778 A1* | 1/2020 | Kim | G10L 15/30 |
| 2020/0013396 A1* | 1/2020 | Park | G10L 15/30 |
| 2020/0066254 A1* | 2/2020 | Hiroe | G10L 15/30 |
| 2020/0105255 A1* | 4/2020 | Huang | G06F 16/3329 |

OTHER PUBLICATIONS

Kennedy J, Leite I, Pereira A, Sun M, Li B, Jain R, Cheng R, Pincus E, Carter EJ, Lehman JF. Learning and reusing dialog for repeated interactions with a situated social agent. InInternational Conference on Intelligent Virtual Agents Aug. 27, 2017 (pp. 192-204). Springer, Cham. (Year: 2017).*

Jonell P, Bystedt M, Dogan FI, Fallgren P, lvarsson J, Slukova M, Wennberg U, Lopes J, Boye J, Skantze G. Fantom: A crowdsourced social chatbot using an evolving dialog graph. Proc. Alexa Prize. 2018. (Year: 2018).*

Mell, P., et al., "The NIST Definition of Cloud Computing", National Institute of Standards and Technology Special Publication 800-145, Sep. 2011, pp. 1-7, U.S. Department of Commerce, United States.

Kennedy, J. et al.; "Learning and Reusing Dialog for Repeated Interactions With a Situated Social Agent", IVA '17 17th International Conference on, Aug. 27-30, 2017, pp. 192-204, United States.

Oraby, S. et al.; ""How May I Help You?": Modeling Twitter Customer Service Conversations Using Fine-Grained Dialogue Acts", IUI '17 22nd ACM Inter. Conf. on, Mar. 13-16, 2017, pp. 343-355, arxiv.org, United States.

Aggarwal, M. et al.; "Reinforcement Learning Based Conversational Search Assistant", Cornell University Library, Sep. 17, 2017, pp. 1-11, arxiv.org, United States.

Jadeja, M. et al.; "Deep Reinforcement Learning for Conversational AI", ICTIR '17 Workshop on Search-Oriented Conversational AI (SCAI '2017), Sep. 15, 2017, pp. 1-5, arxiv.org, United States.

* cited by examiner

500
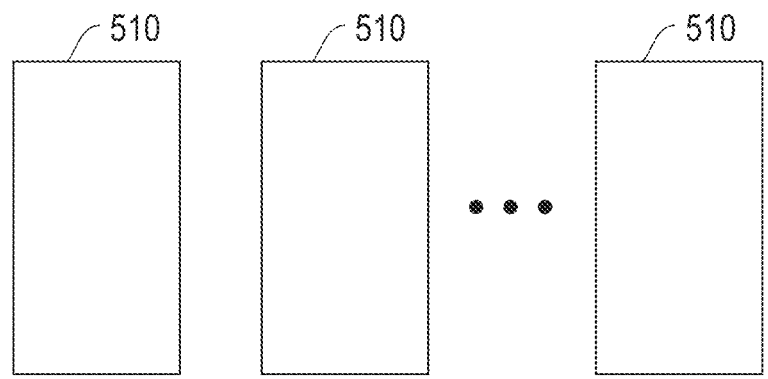
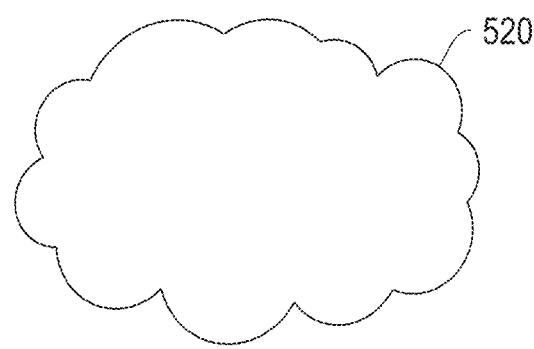
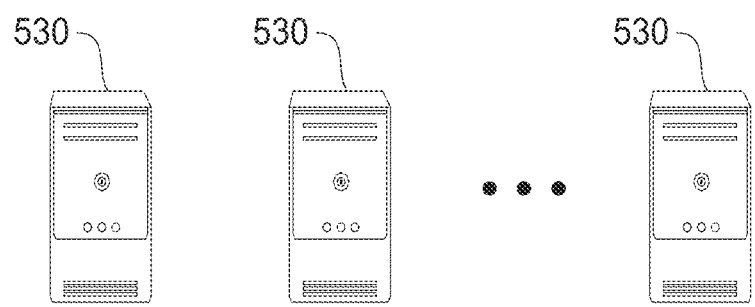
FIG. 5

GRAPH BASED PREDICTION FOR NEXT ACTION IN CONVERSATION FLOW

BACKGROUND

In recent years, great efforts have been made to research and develop virtual conversation assistants (e.g., Chatbots). Currently, in conversations with chatbots, a large percentage of user answers returns default or does not match any conditions including intents, entities or variables in a dialog. In these cases, the chatbot system responds with a default message, e.g., "I am sorry," "I do not understand," etc. Conventional methods are focused on improving the accuracy of natural language understanding solely based on linguistic features.

SUMMARY

Embodiments relate to predicting a next action in a conversation flow based on graph theory, conversation logs and external user context information. One embodiment provides a method for predicting a next action in a conversation system that includes obtaining, by a processor, information from conversation logs and a conversation design. The processor further creates a dialog graph based on the conversation design. Weights for edges in the dialog graph are determined based on the information from the conversation logs. An unrecognized user input in the conversation system is detected. The unrecognized user input is analyzed, and a next action is predicted based on dialog nodes in the dialog graph and historical paths. A guiding conversation response is generated based on the predicted next action.

These and other features, aspects and advantages of the present invention will become understood with reference to the following description, appended claims and accompanying figures.

BRIEF DESCRIPTION OF THE DRAWINGS

FIG. 5 is a block diagram illustrating a distributed system for predicting next action based on graph theory and sequential chat logs, according to one embodiment;

DETAILED DESCRIPTION

Figure 1:
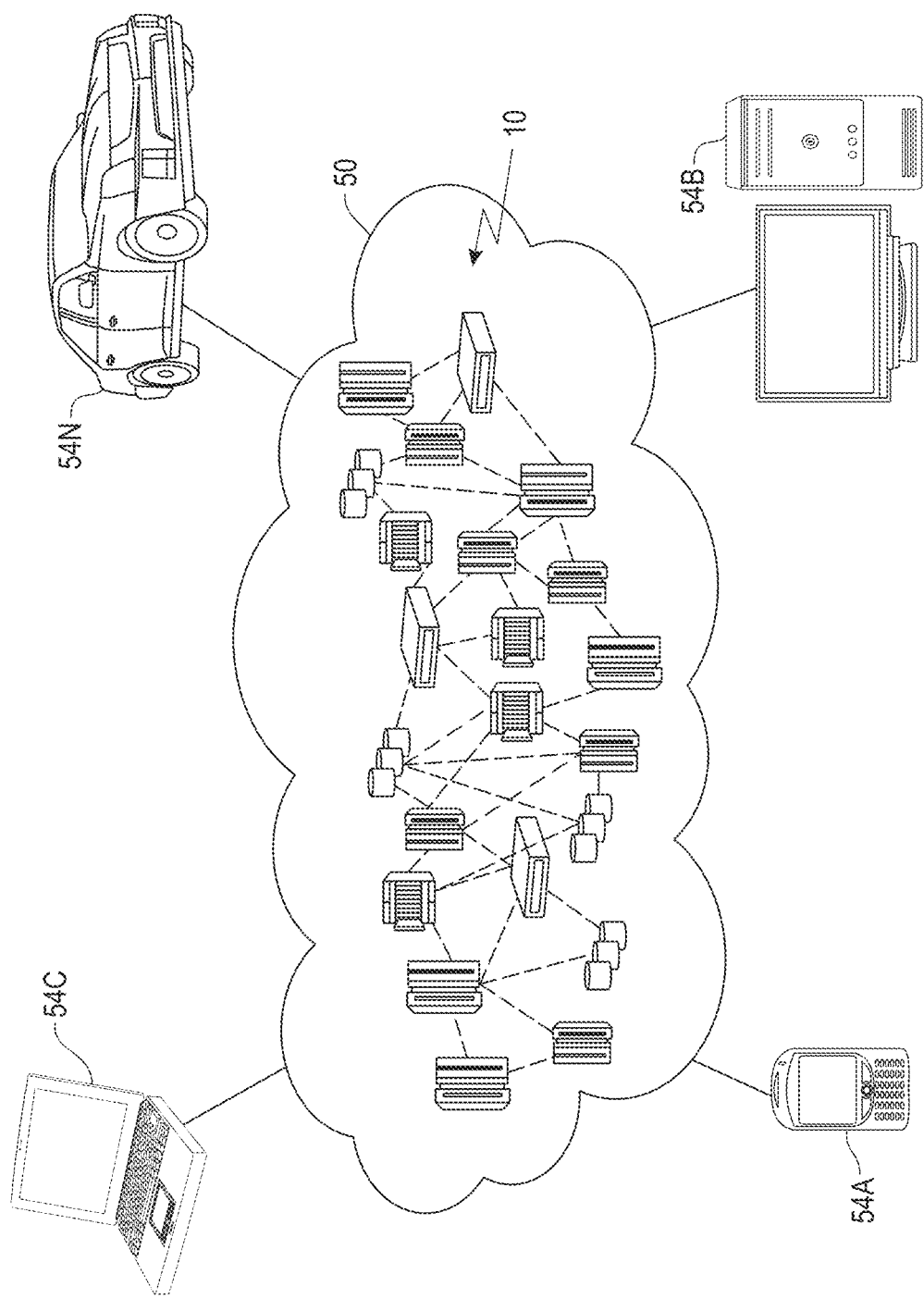
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to predicting next action based on graph theory and conversation logs. One embodiment provides a method that includes obtaining, by a processor, information from conversation logs and a conversation design. The processor further creates a dialog graph based on the conversation design. Weights for edges in the dialog graph are determined based on the information from the conversation logs. An unrecognized conversation turn in the dialog graph is detected. A next action is predicted based on dialog nodes in the dialog graph and historical paths. A guiding conversation response is generated based on the predicted next action.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
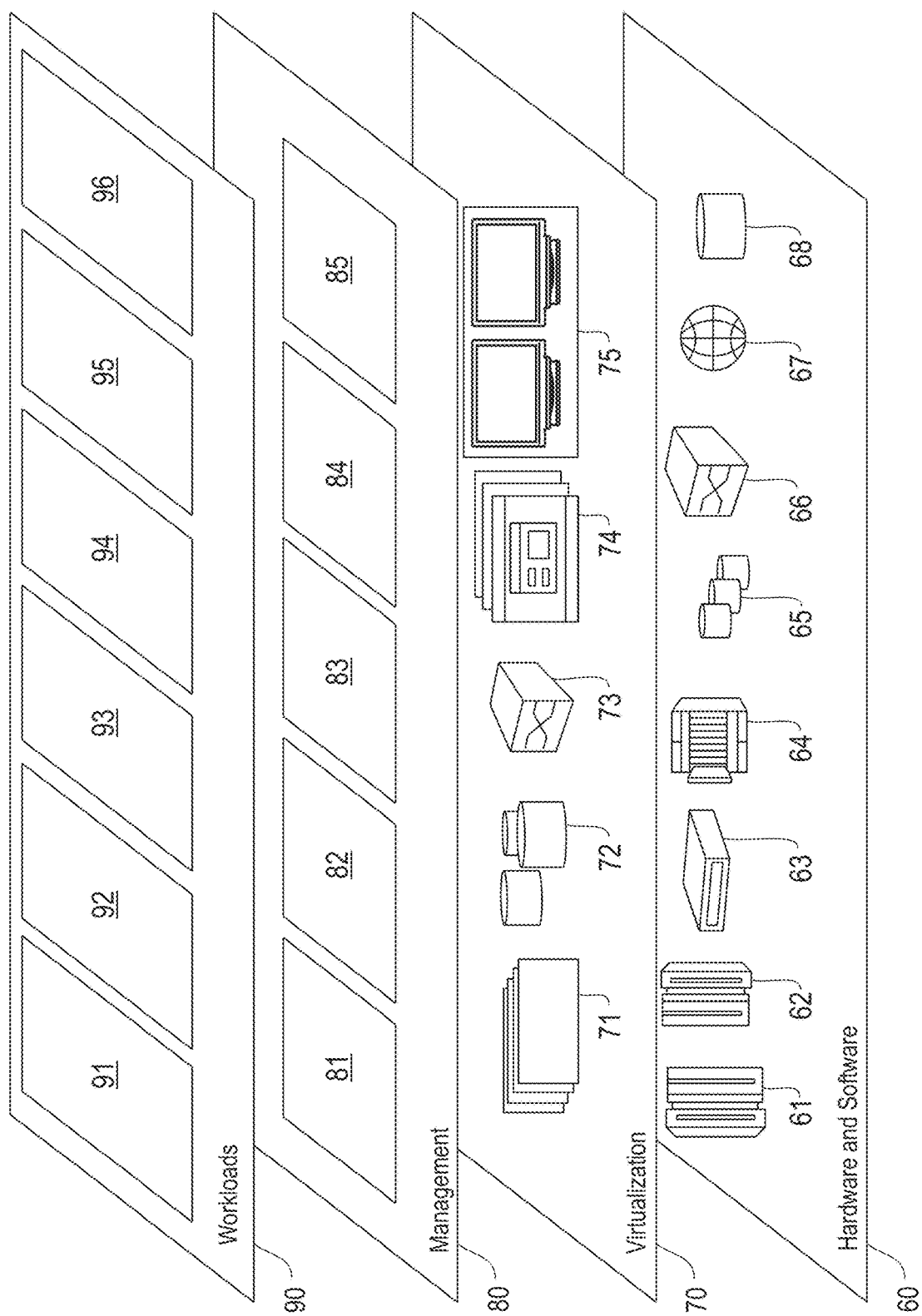
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predicting next action based on graph theory and conversation logs (e.g., sequential chat logs, etc.) processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
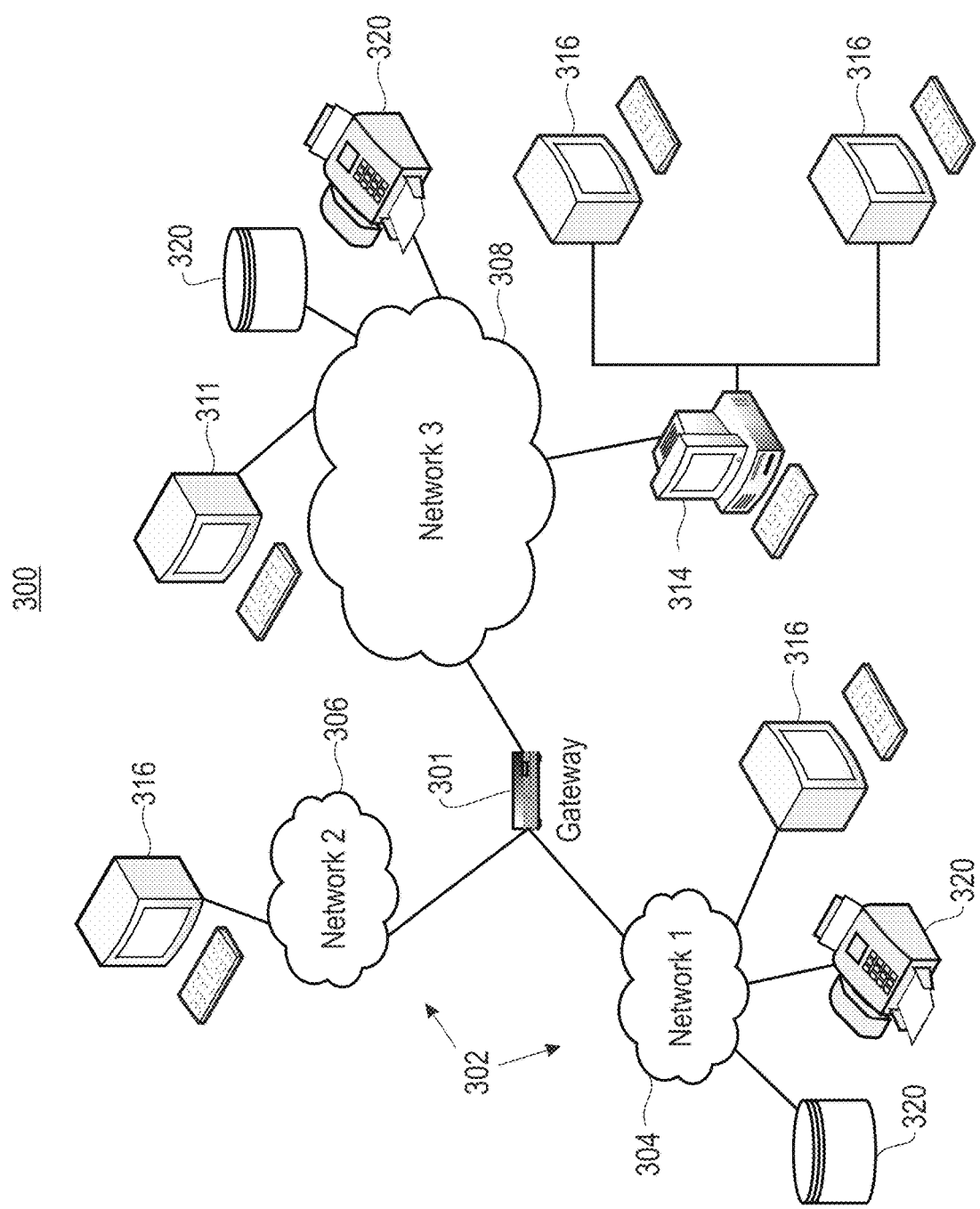
FIG. 3 is a network architecture of a system for predicting next action based on graph theory and sequential chat logs, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
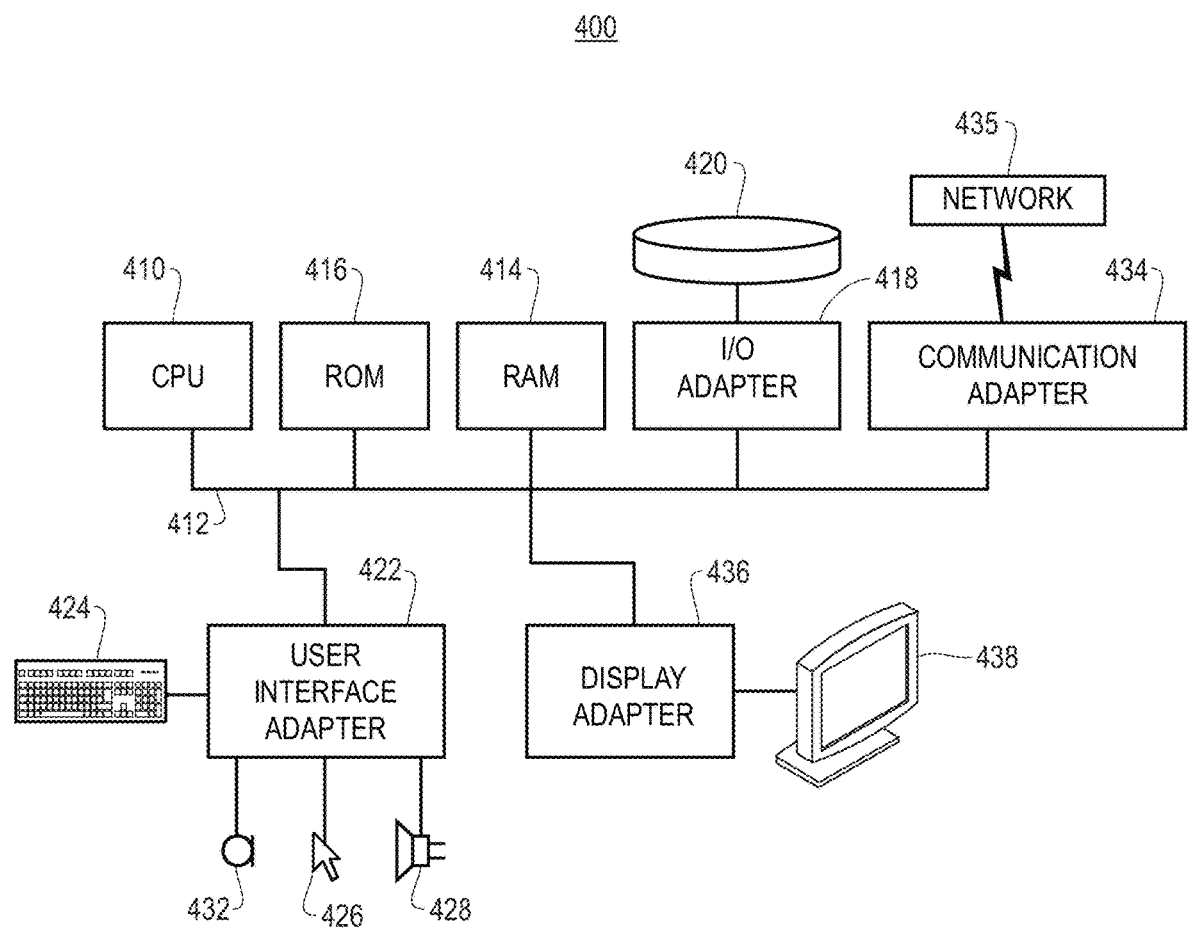
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

FIG. 5 is a block diagram illustrating a system 500 that may be employed for predicting next action based on graph theory and sequential chat logs, according to one embodiment. In one embodiment, the system 500 includes client devices 510 (e.g., mobile devices, smart devices, computing systems, etc.), a cloud or resource sharing environment 520

(e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500, provides for reducing chatbots (or other similar processing, such as virtual assistants) default replies and improving conversation fluency and efficiency by predicting next action based on graph theory and sequential chat logs. In one embodiment, system 500 includes analyzing external user context information (e.g., time, location, etc.) to improve predictions of next actions for chatbots, virtual assistants, etc. In one embodiment, system 500 builds a dialog graph from a conversation design, and applies weight dialog graph edges based on user chat logs (e.g., historical collections of prior chatbot conversations with users). In one embodiment, a conversation design includes: all dialog node attributes and transition logics (e.g., conditions, contexts, variables, etc.). In some embodiments, a node in the built dialog graph includes the dialog node and all its attributes (e.g., identification (ID), title, relationships (e.g., parent, sibling(s), etc.), metadata, etc.). An edge in the dialog graph is transition logic for any given node pairs. In one embodiment, system 500 analyzes conversation logs, and builds a weighed conversation dialog graph by collecting and analyzing user conversation logs, calculating the transition probabilities among dialog nodes, and weighting edges based on those probabilities.

Figure 6:
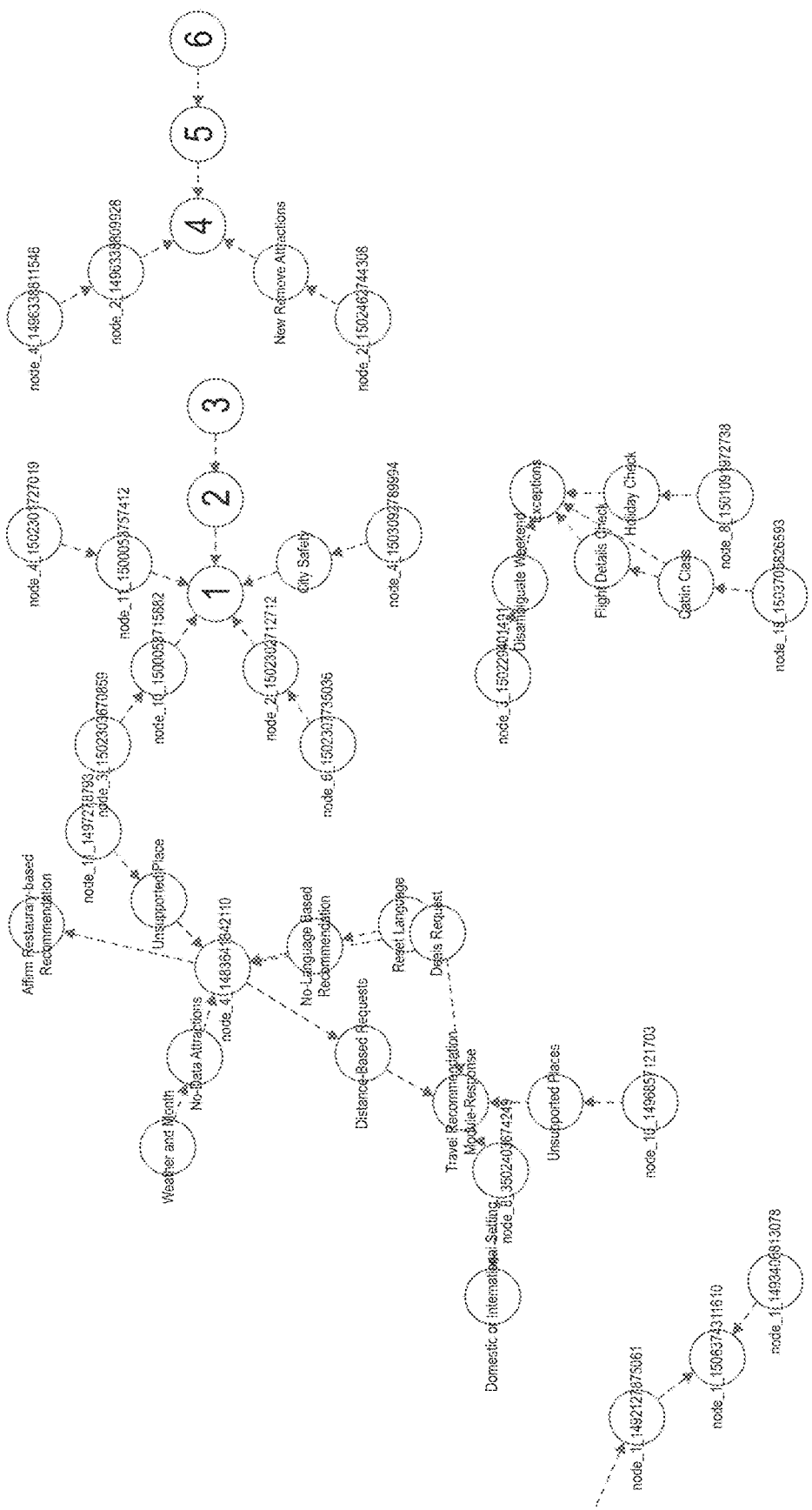
FIG. 6 illustrates an example of building a dialog graph, according to one embodiment.

FIG. 6 illustrates an example of building a dialog graph 600, according to one embodiment. In one embodiment, the dialog nodes include attributes, such as, but not limited to: title, output text, parent, context, creation time/date, update time/date, metadata, next step (e.g., next node information), conditions (e.g., intents, Java script, etc.), description, dialog node ID, previous sibling, recognized user inputs, etc. In one embodiment, the following is example pseudocode for building the dialog graph:

```
Pseudocode: build dialog graph
input: Conversation Design (e.g., WATSON ® Conversation Design)
output: DG (directed dialog graph)
node_set = exportNodes(conversation Design (e.g., WATSON ®
conversation design, etc.)
DG = DirectGraph( )
for dialog_node_a in node_set:
    next_step_node_set = transitionLogicExtraction(node_a)
    for dialog_node_b in next_step_node_set:
        DG.add_edge(dialog_node_a , dialog_node_b) // edge a->b is
added
```

Figure 7:
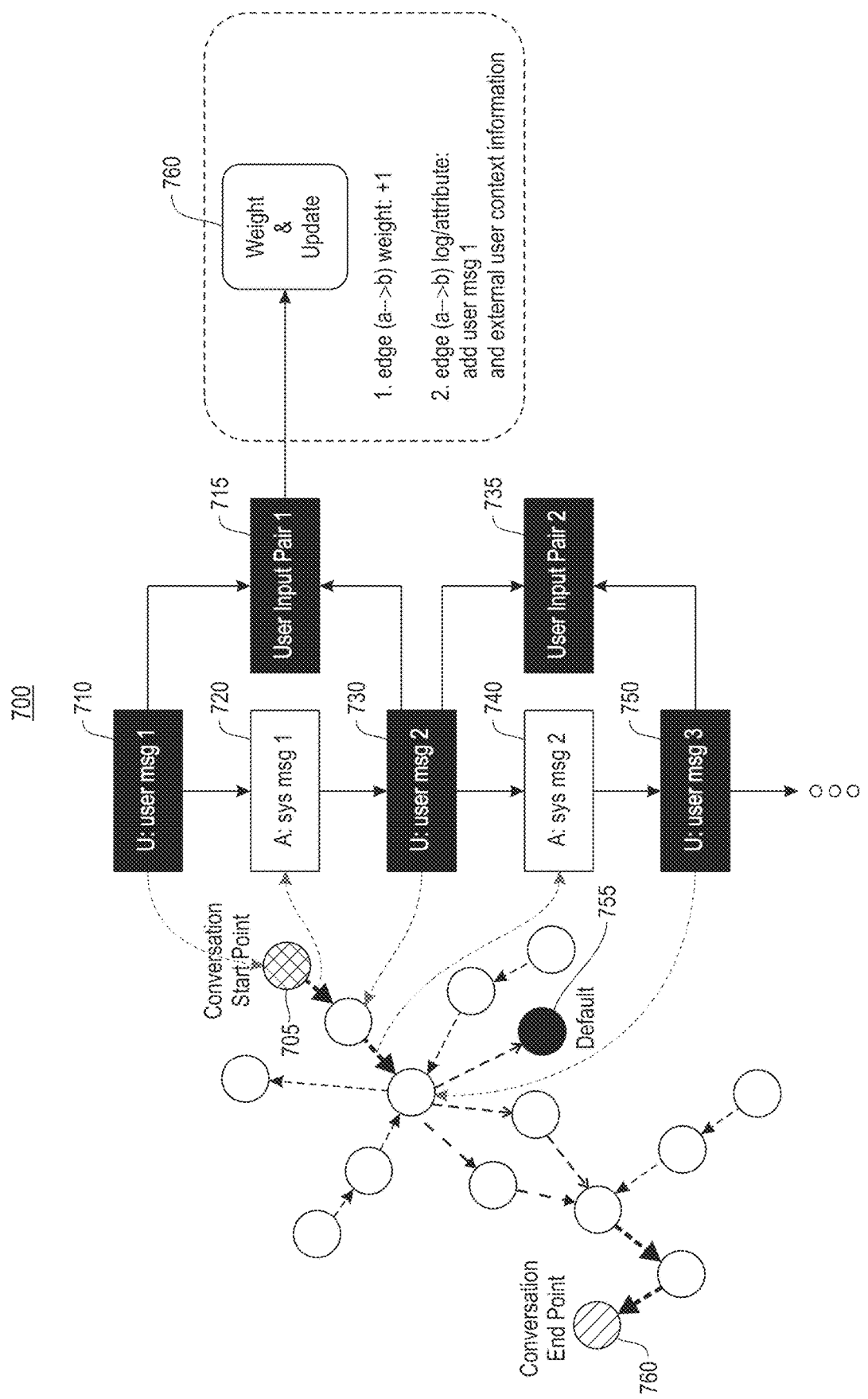
FIG. 7 illustrates an example of weighting of dialog graph edges based on chat logs, and a major conversation flow, according to one embodiment.

FIG. 7 illustrates an example of weighting of dialog graph edges based on chat logs, adding user input and external context information as edge logs/attributes, and a major conversation flow (starting from dialog nodes 705-760), according to one embodiment. In one embodiment, the example dialog graph 700 includes various dialog nodes including the conversation start point node 705, the default dialog node 755 and the conversation end point dialog node 760. The blocks on the right of FIG. 7 show the user and chatbot back and forth dialog, including a user (U) message (msg) 1 710 (e.g., user conversation text), user input pair 1 715, Answer (A) from the system (e.g., computing node 10, FIG. 1, processing system 300, FIG. 3, system 400, FIG. 4, system 500, FIG. 5, etc.) denoted as sys msg 1 720, user msg 2 730, user input pair 2 735, sys msg 2 740, user msg 3 750, etc.

In one embodiment, example pseudocode for creating the dialog graph with weighted edges is as follows:

```
PSEUDOCODE: weight and update dialog graph
INPUT: conversation_log (between user and virtual assistant)
    DG <- directed dialog graph
OUTPUT: DG (weighted dialog graph)
for each user input pair p in conversation_logs:
    // extract the recognized user inputs and external context
    information
    user_input_a, user_input_b, external_context_info =
    extractUserInput(p)
    // extract the hit dialog nodes in the conversation system
    dialog_node_a, dialog_node_b = extractDialogNode(user_input_a,
    user_input_b)
    // update the weight of edge
    DG[dialog_node_a][dialog_node_b]['weight'] += 1
    // record the user input and external context information into the
    edge
    DG[dialog_node_a][ dialog_node_b]['log'].add(user_input_a,
external_context_info)
    Normalize_weight(DG).
```

Figure 8:
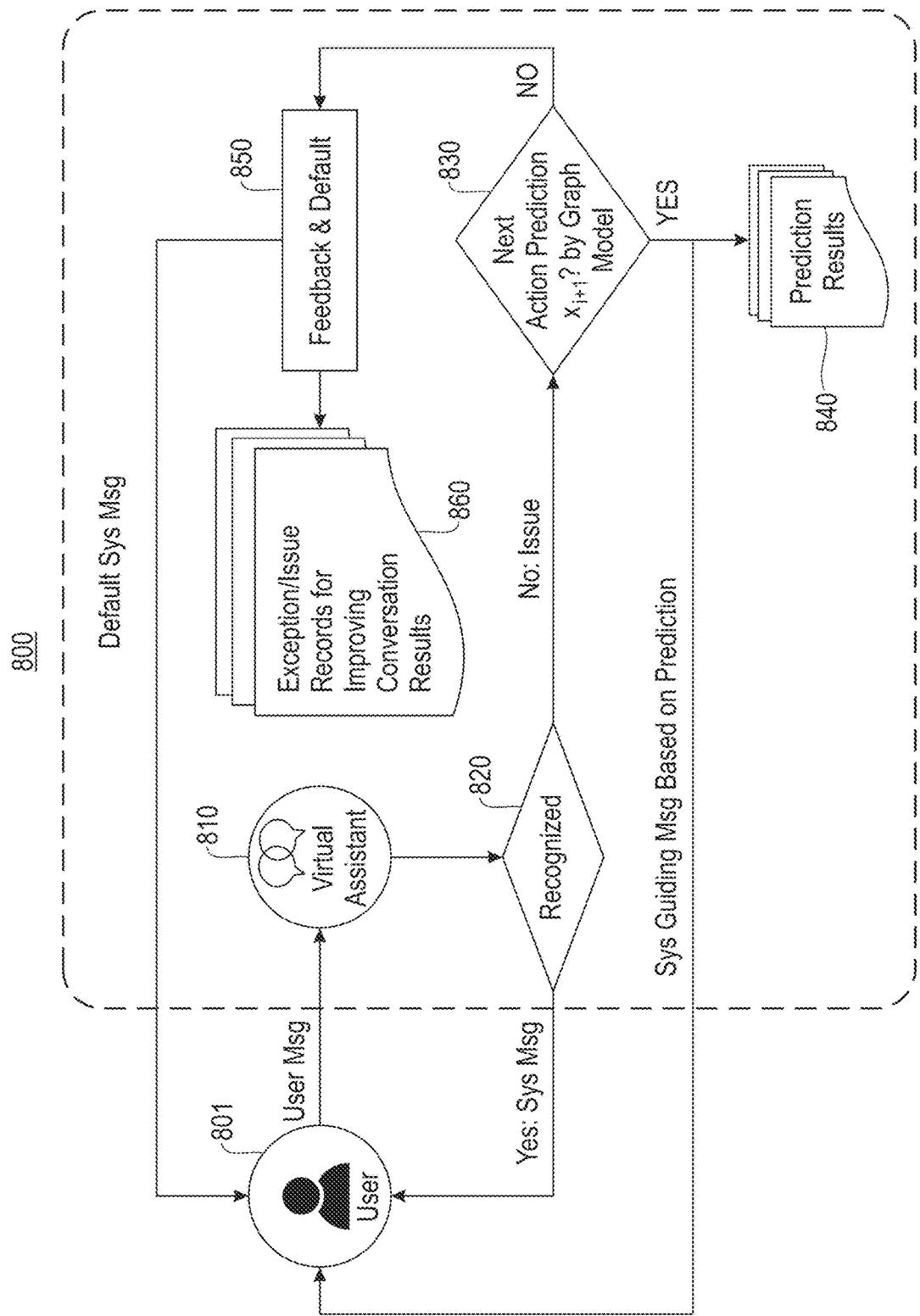
FIG. 8 illustrates a flow diagram for a process for next action prediction, according to one embodiment.

FIG. 8 illustrates a flow diagram 800 for a process for next action prediction, according to one embodiment. In one embodiment, the prediction of the next action based on a graph model includes receiving or obtaining individual chat logs, detecting unrecognized user input, predicting the next action and output an action prediction (with guiding conversation). In one embodiment, a user message (msg) is obtained from a user 801 as the input of the flow diagram 800. The input is obtained as text (e.g., either input as text, input as voice and converted to text using natural language (NL) processing, etc.). The virtual assistant 810 (or chatbot, e.g., WATSON®) receives the input and determines at 820 whether the input message is recognized or not. If the input is recognized at 820, the system (e.g., computing node 10, FIG. 1, processing system 300, FIG. 3, system 400, FIG. 4, system 500, FIG. 5, etc.) outputs a system message (Sys Msg) back to the user 801 as output (e.g., text, simulated voice, etc.) and waits for another input. If the system does not recognize the input, in block 830 the system determines the next action prediction by processing the input and external context information based on the pre-trained graph model. If the next action prediction determines an output, the prediction results 840 are output to the user 801, and the system awaits further input from the user 801. If block 830 did not determine prediction results 840, the flow 800 proceeds to block 850. In block 850 feedback from block 830 is sent to block 860 and a default message (e.g., I don't understand, can you clarify, etc.) is output to the user 801. In block 860, the feedback is stored as exception/issue (with the input) records for improving conversation design. In one embodiment, the exception/issue records may become associated with a follow up input such that the system learns the next time a same or similar user input is received.

Figure 9:
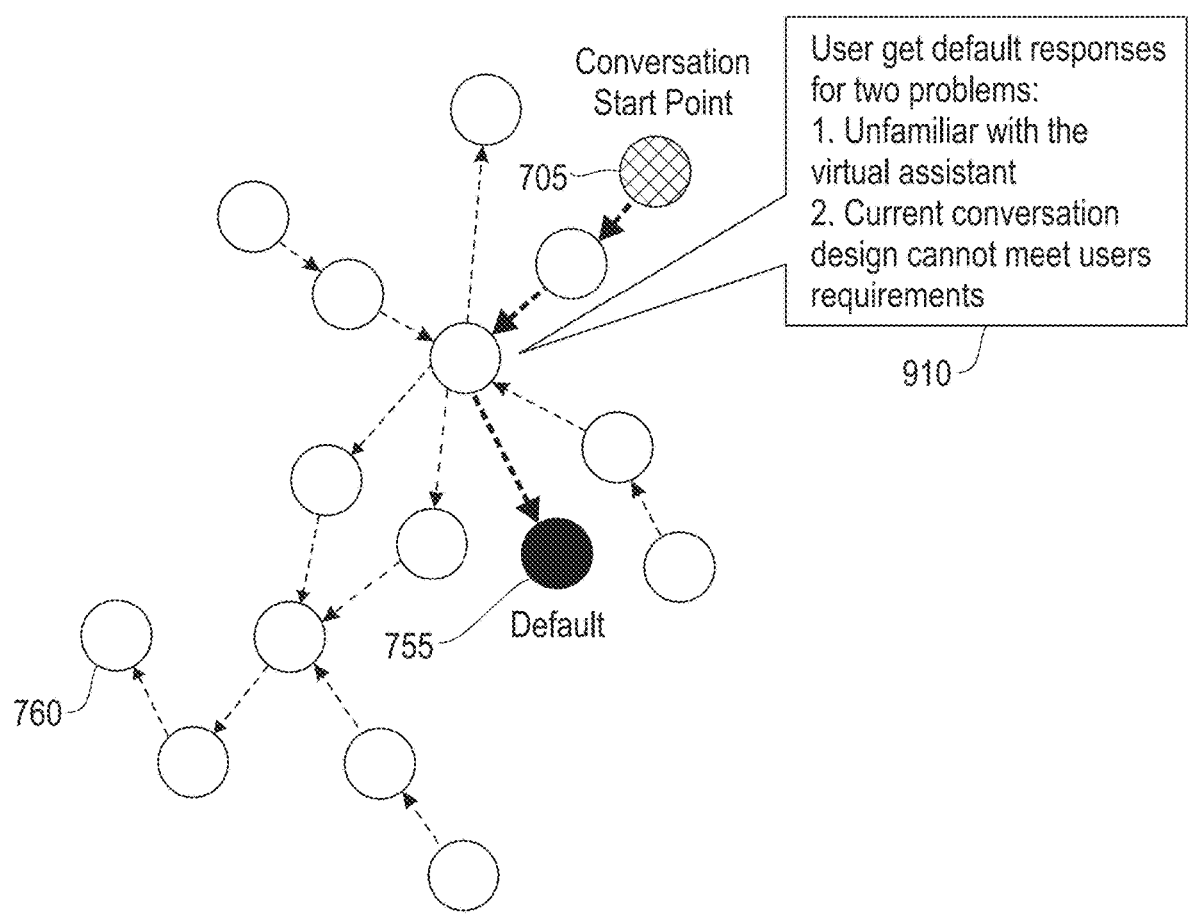
FIG. 9 illustrates an example dialog graph showing detection of unrecognized user input, according to one embodiment.

FIG. 9 illustrates an example dialog graph 900 showing detection of unrecognized user input, according to one embodiment. The dialog graph 900 includes the conversation start point 705, the default dialog node 755 and the potential conversation end point dialog node 760. At the point 910 in the graph 900, the default output at dialog node 755 is output as a system (e.g., computing node 10, FIG. 1, processing system 300, FIG. 3, system 400, FIG. 4, system 500, FIG. 5, etc.) response if 1: the input dialog is unfamiliar to the virtual assistant (or chatbot), or if the current conversation design cannot meet the user requirements (e.g., cannot recognize the user's input). In one embodiment, the default dialog node for the detection of an abnormal conversation case is as follows:

```
PSEUDOCODE: detect abnormal conversation case
INPUT: DG <- dialog graph
    user_input
    current_dialog_node
OUTPUT: bool
next_dialog_node = nextNode(current_dialog_node, user_input)
if next_dialog_node is default node:
    return True
else:
    return False.
```

Figure 10:
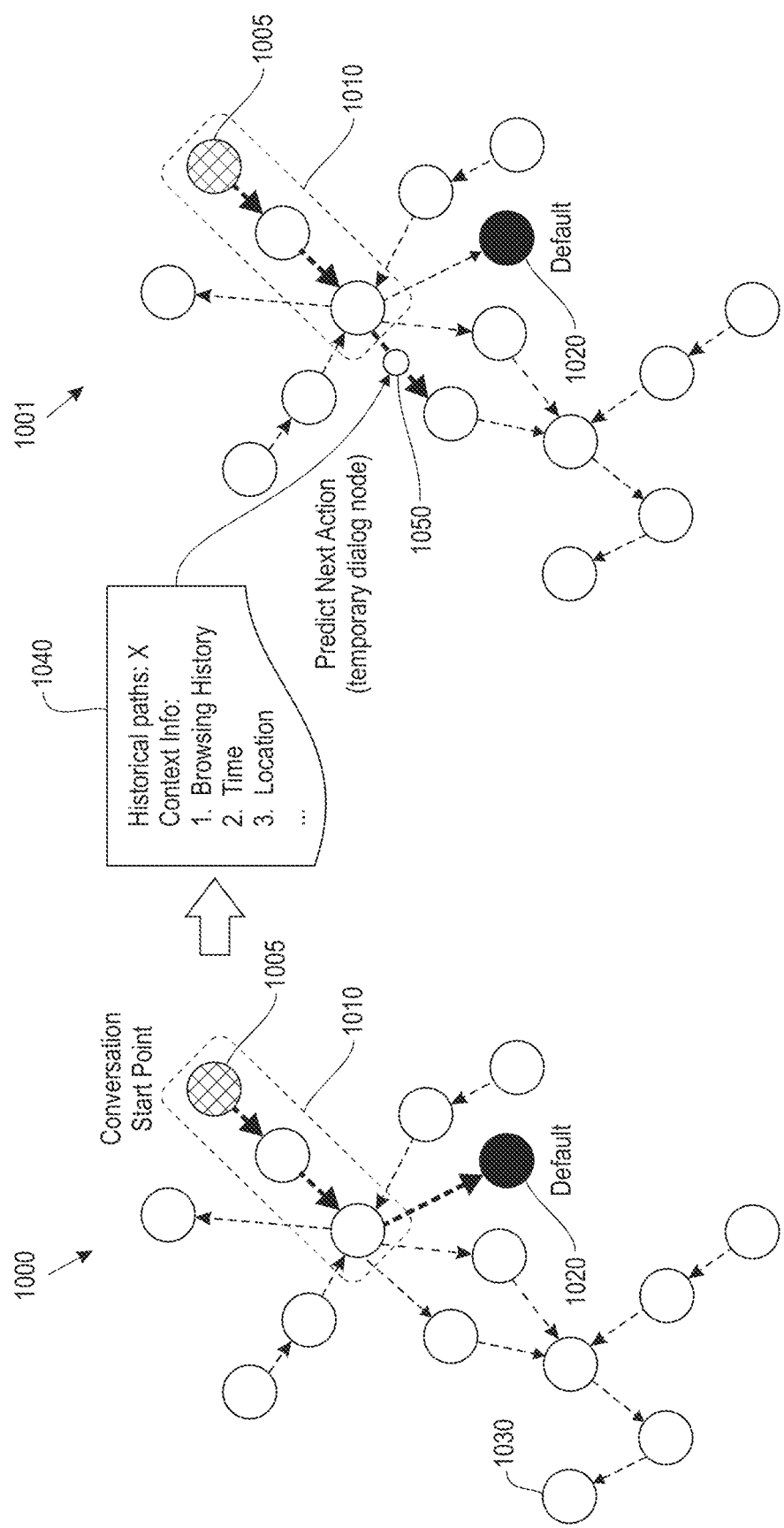
FIG. 10A illustrates an example graphical representation of conversation nodes prior to employment of one or more embodiments.
FIG. 10B illustrates an example graphical representation of conversation nodes after employment of a process for next action prediction, according to one embodiment.

FIG. 10A illustrates an example dialog graph 1000 (e.g., graphical representation of conversation nodes) prior to employment of one or more embodiments. The dialog graph 1000 includes the conversation start point node 1005, which is part of the dialog portion 1010 of the dialog graph 1000, the default node 1020 and the conversation end point node 1030. Without employment of the next action prediction processing, after the last dialog node in the dialog portion 1010 the output message at the default node 1020 would be output to a user. The feedback and information regarding the issue would be stored as a historical path 1040. The information stored as the historical path 1040 includes information, such as, but not limited to: browsing history, time, location, etc. This historical path 1040 information is used to predict the next action (see, e.g., flow diagram 800 for a process for next action prediction) and is inserted as a temporary dialog node 1050 in FIG. 10B.

FIG. 10B illustrates an example graphical representation of conversation nodes after employment of a process for next action prediction, according to one embodiment. In the updated dialog graph 1001, instead of the dialog for a conversation leading to the default node 1020 (with a default response, e.g., "I do not understand," "please clarify," etc.), the system (e.g., computing node 10, FIG. 1, processing system 300, FIG. 3, system 400, FIG. 4, system 500, FIG. 5, etc.) executes the process for next action prediction based on graph theory, NLP (Natural Language Processing), text analytics methods, and temporarily inserts a dialog node 1050 in the dialog graph 1001. This insertion of the temporary dialog node 1050 alters the graphical representation of the dialog nodes so that the conversation between a user and a virtual assistant or chatbot moves forward to another dialog node instead of the default dialog node 1020. In one embodiment, pseudocode for the next action prediction is as follows:

```
PSEUDOCODE: next action prediction
INPUT: DG <- dialog graph
    X <- X₁, X₂, X₃ ... Xᵢ
    //historical path based chat log
    context_info
OUTPUT: Optimal_Xᵢ₊₁
    //Guiding Conversation
    Optimal_Xᵢ₊₁ = argmax_{Xi+1} P(Xᵢ₊₁|X₁, X₂, X₃ ... Xᵢ;
    external_context_info), where X are nodes and i is a an integer ≥0.
```

Figure 11:
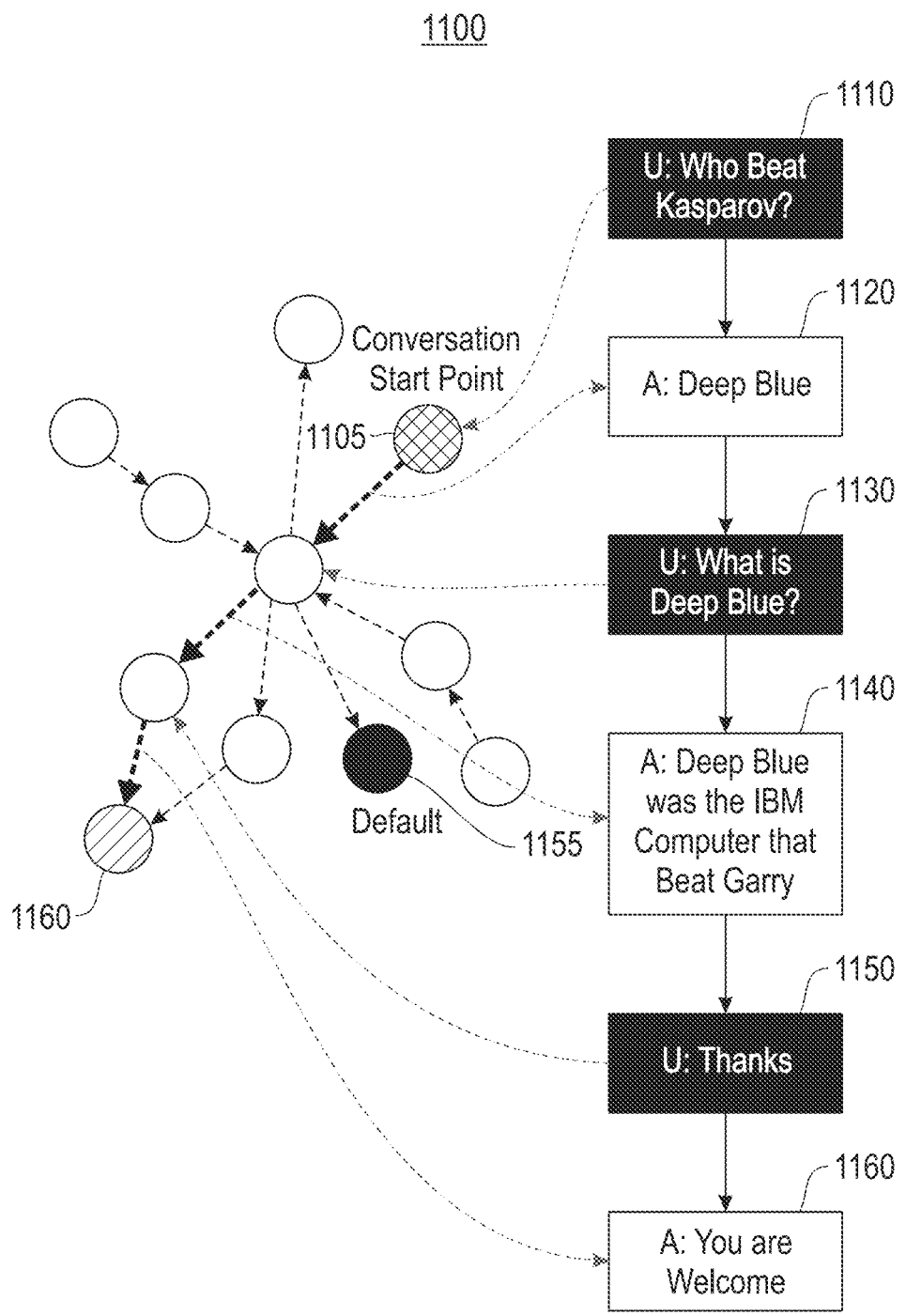
FIG. 11 illustrates an example graphical representation of conversation nodes using a learned model, according to one embodiment.

FIG. 11 illustrates an example graphical representation of conversation nodes by dialog graph 1100 using a learned model, according to one embodiment. In one embodiment, the dialog graph 1100 includes conversation start point dialog node 1105, the default dialog node 1155, intermediary nodes and conversation end point dialog node 1160. In one embodiment, the blocks 1110, 1120, 1130, 1140, 1150 and 1160 on the right side of FIG. 11 include the conversation questions/comment from a user and responses from a virtual assistant or chatbot. The arrows from/to the blocks show the position of the user and virtual assistant or chatbot dialog questions/answers/comments in the dialog graph 1100. In this example, the virtual assistant or chatbot has the correct output to the input from the user. The information that the virtual assistant or chatbot uses to respond to the user is included in the recognized historical data. Therefore, in this example, no further processing is needed for next action prediction.

Figure 12:
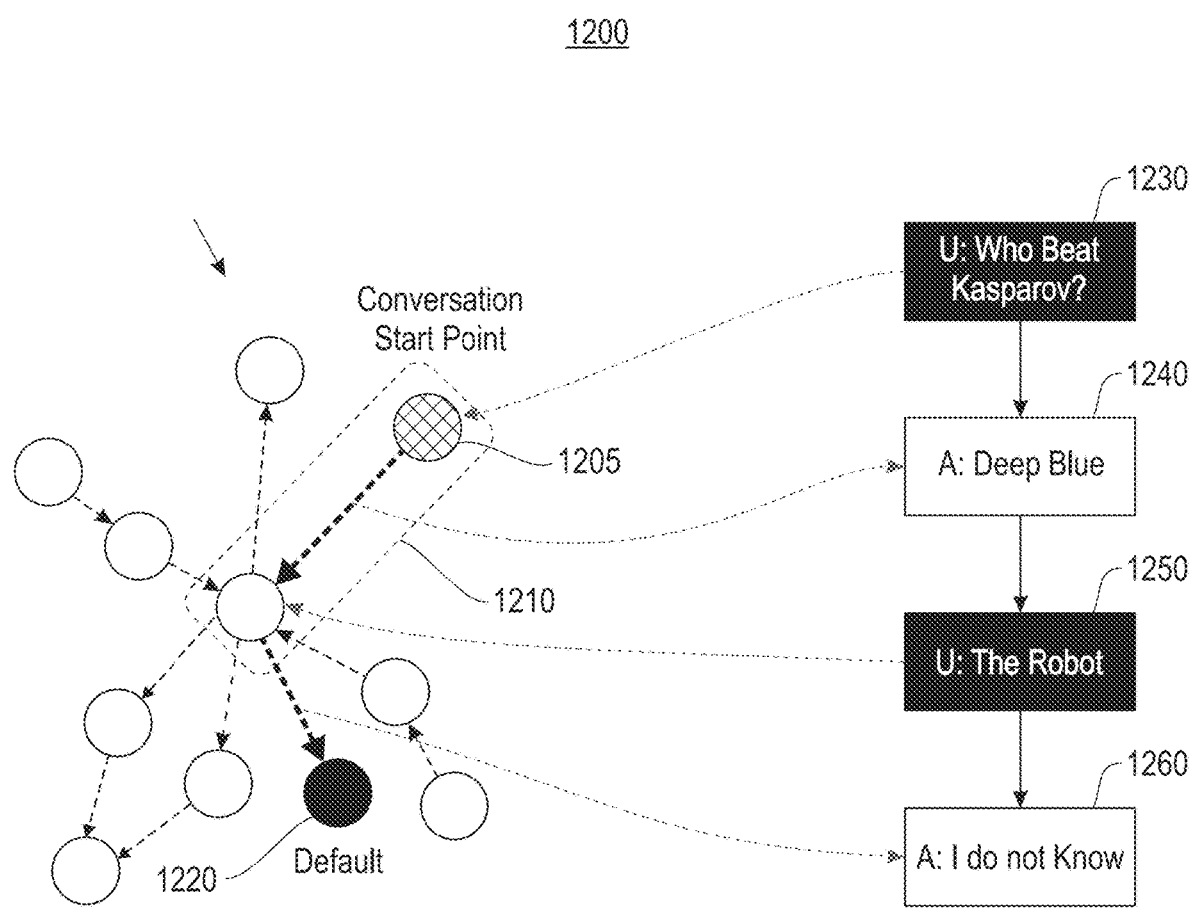
FIG. 12 illustrates an example graphical representation of conversation nodes where a default action is required, according to one embodiment.

FIG. 12 illustrates an example graphical representation of conversation nodes for traditional example graph 1200 without employment of a process for next action prediction where a default action will be adopted if the user input is not recognized by the conversation system, according to one embodiment. In one embodiment, the dialog graph 1200 includes conversation start point dialog node 1205, the default dialog node 1220, and intermediary nodes (without a conversation end point dialog node). In one embodiment, the blocks 1230, 1240, 1250 and 1260 on the right side of FIG. 12 include the conversation questions/comment from a user and responses from a virtual assistant or chatbot. The arrows from/to the blocks show the position of the user and virtual assistant or chatbot dialog questions/answers/comments in the dialog graph 1200. In this example, the virtual assistant or chatbot did not recognize a correct output to the input from block 1250 from the user. Therefore, the traditional virtual assistant or chatbot outputs a default message from block 1260 (e.g., "I do not know") without employment of a process for next action prediction.

Figure 13:
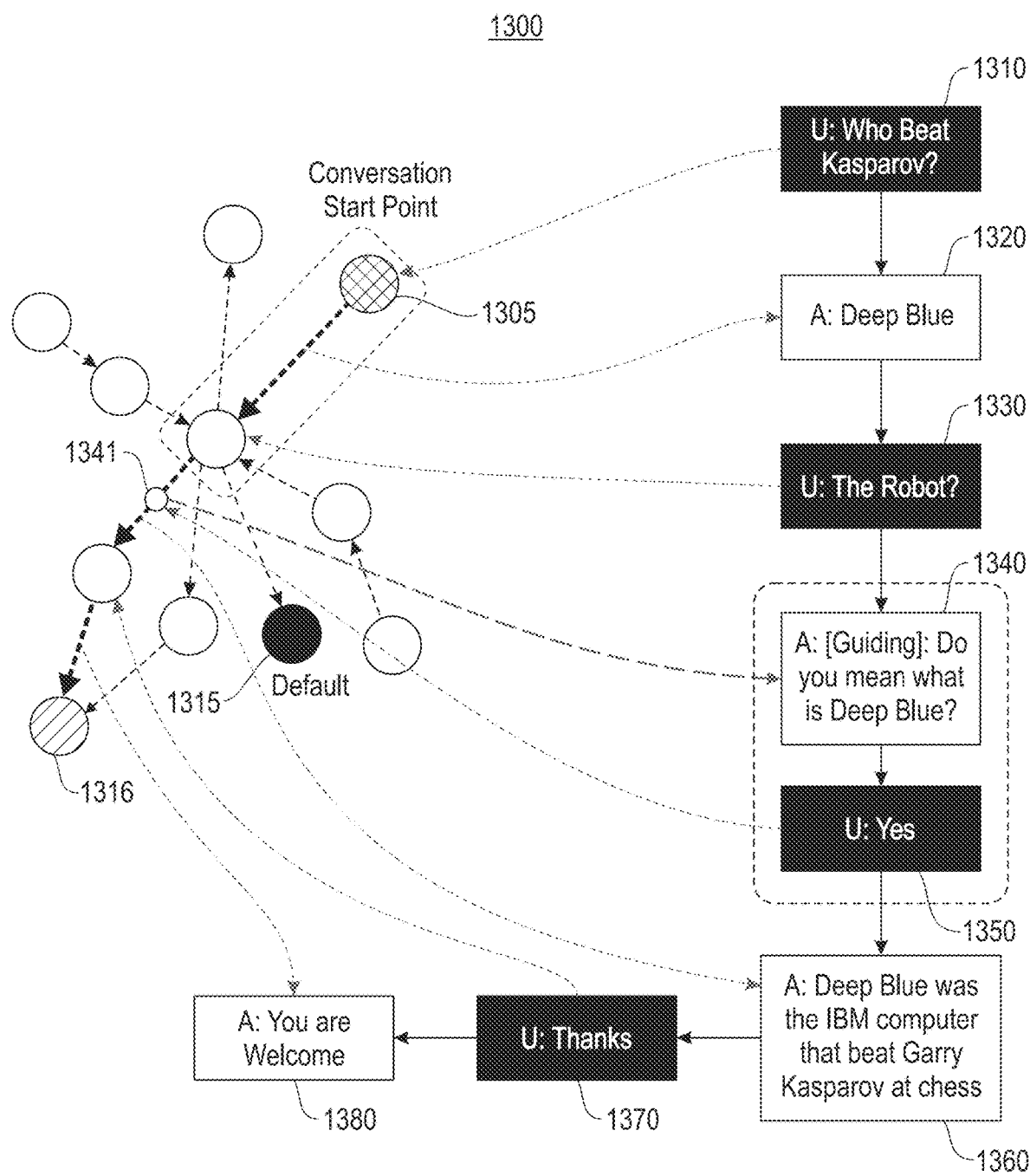
FIG. 13 illustrates an example graphical representation of conversation nodes where a next action prediction is inserted in a dialog graph, according to one embodiment.

FIG. 13 illustrates an example graphical representation of conversation nodes where a next action prediction is inserted in a dialog graph 1300, according to one embodiment. In one embodiment, the dialog graph 1300 includes conversation start point dialog node 1305, the default dialog node 1315, intermediary nodes, potential conversation end point dialog node 1316 and a temporary dialog node 1341. In one embodiment, the blocks 1310, 1320, 1330, 1340, 1350, 1360, 1370 and 1380 on the right side and lower portion of FIG. 13 include the conversation questions/comment from a user and responses from a virtual assistant or chatbot. The arrows from/to the blocks show the position of the user and virtual assistant or chatbot dialog questions/answers/comments in the dialog graph 1300. In this example, the virtual assistant or chatbot did not recognize a correct output to insert based on the input from block 1330 from the user. In this example, the system (e.g., computing node 10, FIG. 1, processing system 300, FIG. 3, system 400, FIG. 4, system 500, FIG. 5, etc.) executing the next action prediction process obtains a predicted next action in the form of a guiding message in block 1340 of "Do you mean what is Deep Blue?" from the learning model that uses next action prediction based on graph theory, sequential chat logs and user external context information. Once the guiding message in block 1340 is received by the user, the dialog proceeds to the next dialog node towards the conversation end point dialog node 1316. On the other hand, if the prediction has low confidence score or fail to make the prediction, in this example, the system (e.g., computing node 10, FIG. 1, processing system 300, FIG. 3, system 400, FIG. 4, system 500, FIG. 5, etc.) executing the next action prediction process would proceed to block 850 in FIG. 8 and outputs a default message to the user.

Figure 14:
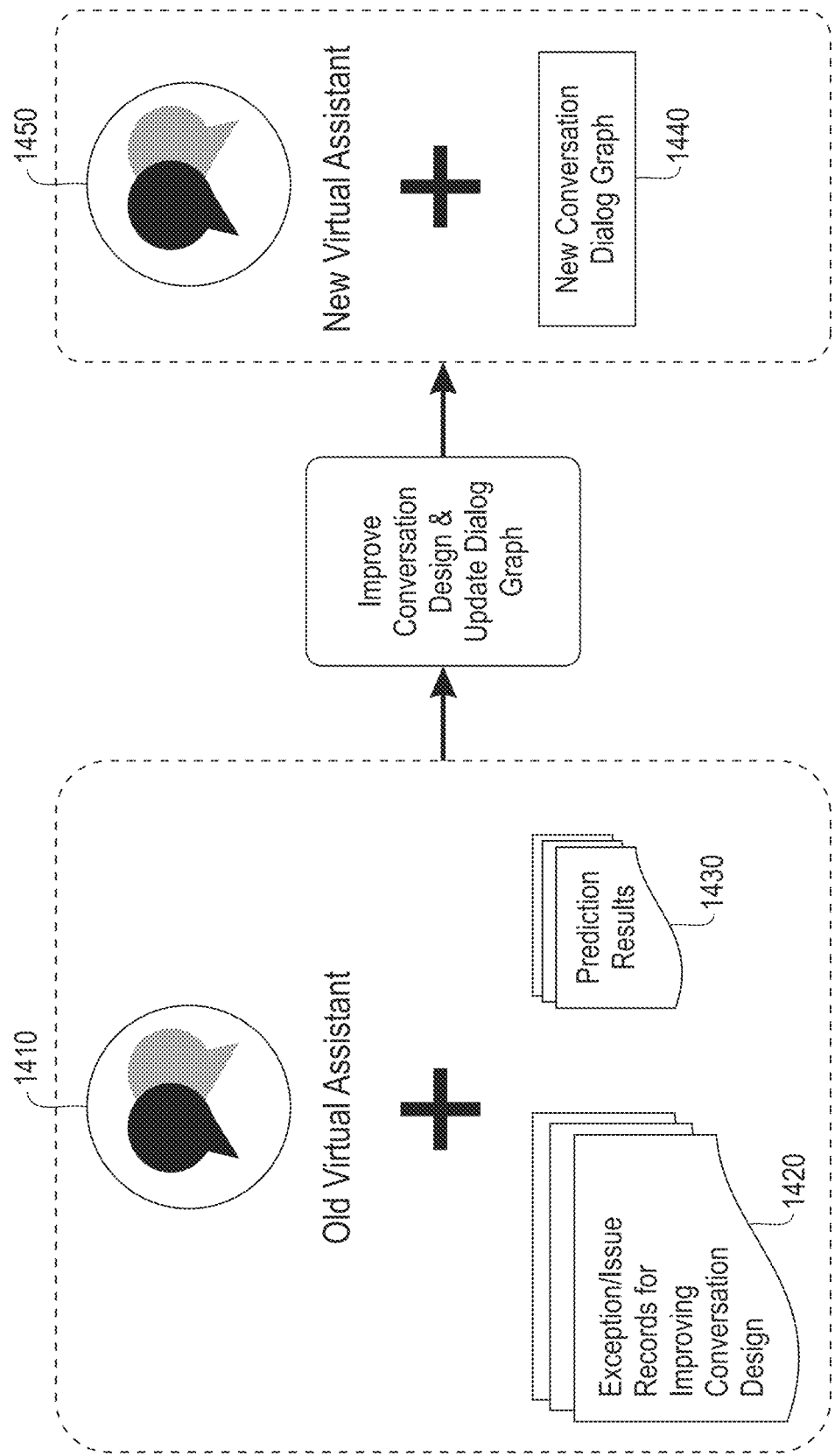
FIG. 14 illustrates an example of dialog input, learning, and output of a new conversation dialog graph, according to one embodiment.

FIG. 14 illustrates an example high-level diagram of dialog input, learning, and output of a new conversation system and corresponding dialog graph 1440, according to one embodiment. In this example, the old conversation system 1410 (with an old virtual assistant) will be improved by human designer based on exception/issue records 1420 and prediction results 1430, which are stored using the system (e.g., computing node 10, FIG. 1, processing system 300, FIG. 3, system 400, FIG. 4, system 500, FIG. 5, etc.) executing the next action prediction process. The output includes new conversation system 1450 (with new virtual assistant) and corresponding dialog graph 1440.

It is difficult for a researcher/engineer to design a perfect virtual assistant or chatbot with taking all user turns into account. On the other hand, users sometimes do not know how to efficiently talk with virtual assistant of chatbot. One or more embodiments, to a large extent, solves these two problems from the following perspectives. First of all, the graph theory based next action prediction process utilizes massive users' chat log data and context information to detect individual's potential intents and predict corresponding action. Therefore, the result of next action prediction processing of one or more embodiments assists the user to converse with a virtual assistant or chatbot more fluently and efficiently. Moreover, if the next action prediction processing fails to predict the action due to the incomplete conversation design, the exception logs/records are used to improve the conversation design. Additionally, the use of dialog graphs are useful as a tool for a researcher/developer to visualize the conversation structure.

Figure 15:
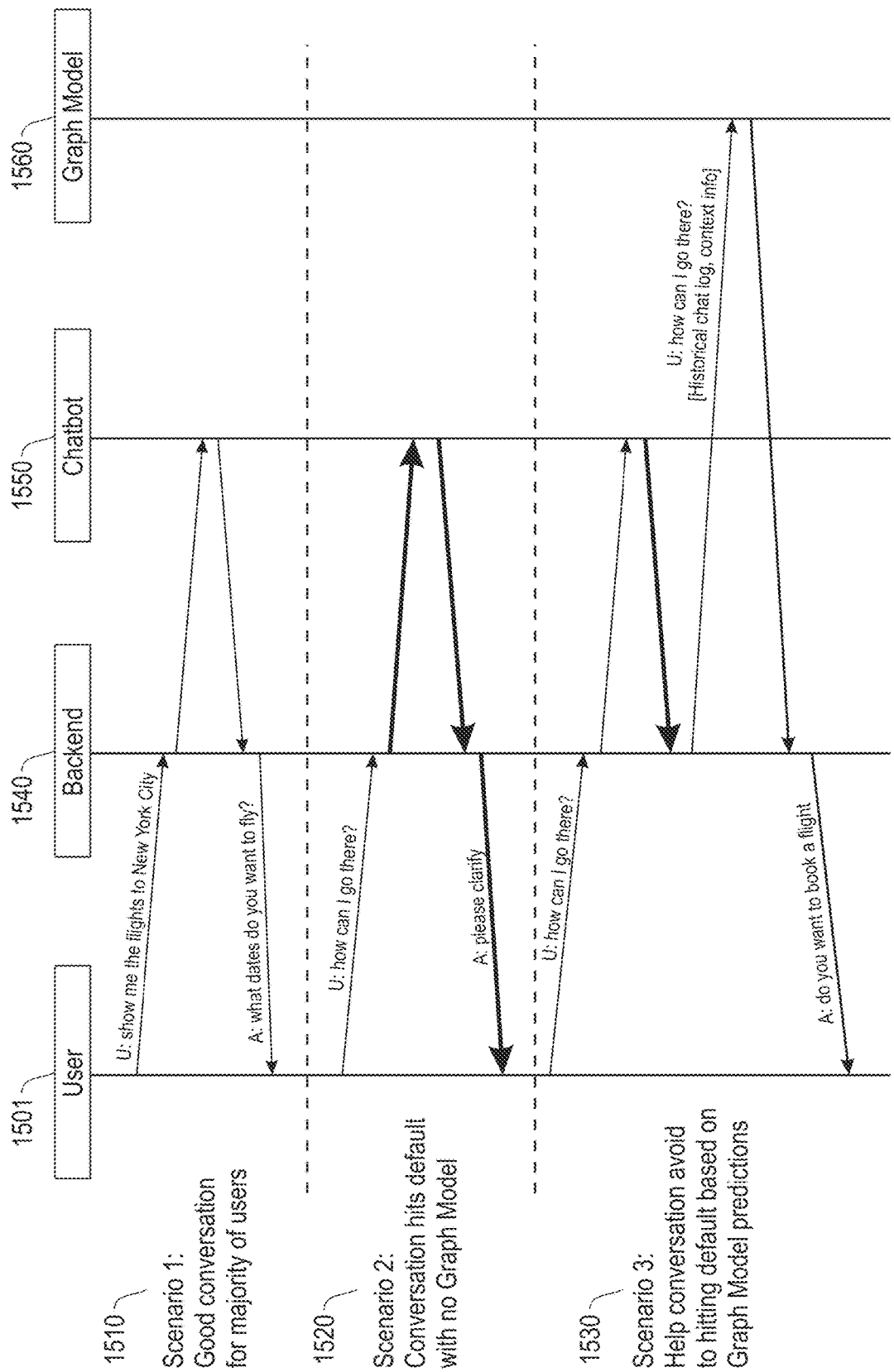
FIG. 15 illustrates an example diagram for integration of next action prediction processing with an example computer system conversation assistant (e.g., WATSON®), according to one embodiment.

FIG. 15 illustrates an example diagram for integration of next action prediction processing with an example computer system conversation assistant (e.g., WATSON®), according to one embodiment. In one embodiment, the integration with a conversation virtual assistant or chatbot implements the weighted graph model at the backend 1540 of the chatbot 1550 platform (e.g., WATSON®). In one embodiment, integration extends conversation flow by generating the guiding message based on generation of a graph model 1560. If the user (input) 1501 is recognized, the integrated virtual assistant or chatbot 1550 replies directly to the user 1501. If the user 1501 input is not recognized, the integrated virtual assistant or chatbot 1550 makes a prediction based on the graph model 1560 and generates a guiding message for the virtual assistant or chatbot 1550 to reply.

As shown in FIG. 15, there are three scenarios on the left side: scenario 1 1510, scenario 2 1520 and scenario 3 1530. Scenario 1 is a good conversation for the majority of users (e.g., user 1501). Scenario 2 is where a conversation hits a default response with no graph model 1560. Scenario 3 includes help conversation avoid to hitting the default response based on graph model 1560 prediction of the next action. In scenario 1 1510, the user 1501 asks the chatbot 1550 "show me the flights to New York city." The chatbot 1550 replies with "what dates do you want to fly." Therefore, in scenario 1, the chatbot 1550 does not need to access the graph model 1560. In scenario 2 1520, the user 1501 asks the chatbot 1550 "how can I go there." The chatbot 1550 does not recognize the input dialog and replies with the default response "please clarify."

In one embodiment, in scenario 3 1530, the user 1501 asks the chatbot 1550 "how can I go there." The chatbot 1550 does not recognize the input dialog, and uses the integrated processing in the back end 1540, accesses the graph model 1560 using historical chat logs, context information, etc. The chatbot 1550 uses the information and replies "do you want to book a flight." This would assist the conversation to proceed to the next dialog step.

Figure 16:
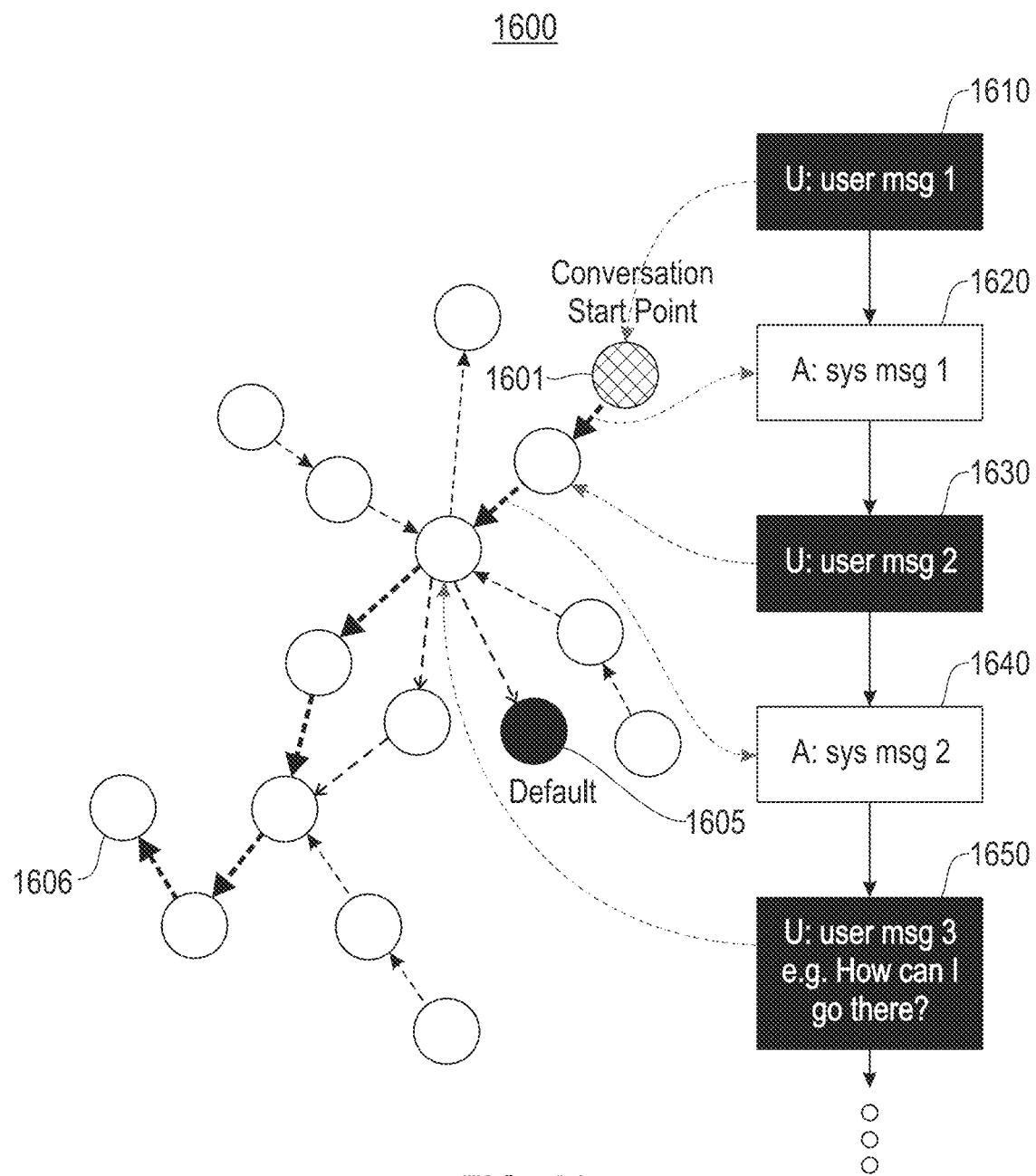
FIG. 16 illustrates an example graphical representation of conversation nodes that are weighted based on chat logs, according to one embodiment.

FIG. 16 illustrates an example graphical representation of conversation nodes that are weighted based on chat logs, according to one embodiment. In one embodiment, the dialog graph 1600 includes the conversation start point node 1601, a default dialog node 1605, intermediary nodes and a potential conversation stop point node 1606. The blocks on the right include user dialog block 1610 (with user msg 1), virtual assistant or chatbot answer 1620 (sys msg 1), user dialog block 1630 (user msg 2), virtual assistant or chatbot answer 1640 (sys msg 2), user dialog block 1650 (user msg 3), etc. The arrows connecting the dialog blocks with the dialog graph 1600 show the positions of the dialog blocks within the dialog graph 1600.

In one embodiment, the graph model includes the dialog graph 1600 that is weighted based on a massive number of user chat logs. The input includes individual chat logs, and optional context information. In one embodiment, the next action prediction processing tracks the conversation flow based on the current chat log, and finds/determines the problematic node (e.g., the dialog node associated with block 1650). The next action prediction processing makes a prediction based on transition probability (see, e.g., the pseudocode listed below). The next action prediction processing generates a guiding conversation and options for the user, and helps the user to avoid hitting the default node 1605. The output includes the guiding conversation with option/options. Note that the context information (e.g., time, location/place, day of week, temperature, activity, etc.) is optional, but the context information can help further improve the prediction. For example, when users chat with the virtual assistant or chatbot through a common destination query conversation flow, the next step for users might be: During lunch time, very likely to query a restaurant; otherwise, query places to visit. An example pseudocode for the processing is as follows:

```
PSEUDOCODE: next action prediction
INPUT: DG <- dialog graph
    X <- X_1, X_2, X_3 ... X_i
    //historical path based chat log
    context_info
OUTPUT: Optimal_X_{i+1}
    //Guiding Conversation
    Optimal_X_{i+1} = argmax_{Xi+1} P(X_{i+1}|X_1, X_2, X_3 ... X_i;
    external_context_info).
```

Figure 17:
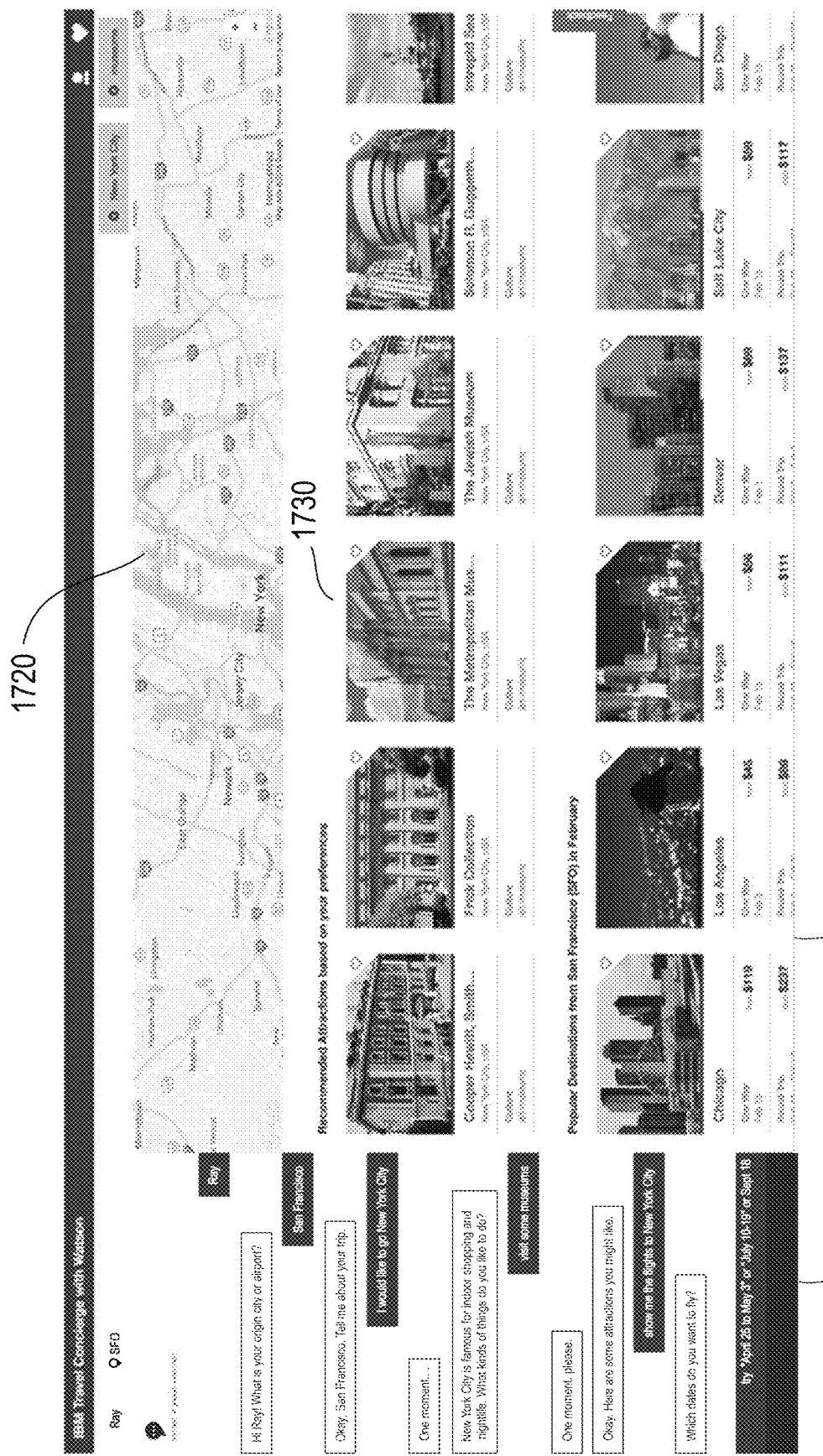
FIG. 17 illustrates an example use case based on next action prediction using graph theory and sequential chat logs, according to one embodiment.

FIG. 17 illustrates an example use case based on next action prediction using graph theory and sequential chat logs, according to one embodiment. On the left side of the example is a conversation dialog 1710 between a user and a virtual assistant or chatbot (e.g., WATSON®). Based on the conversation dialog mentioning that the user would like to go to New York City, the application provides a map 1720. Additionally, based on the conversation dialog mentioning that the user would like to visit museums, the application provides several recommended attractions (i.e., museums) 1730, which each include links for further information. Further, the application may provide additional informative links to popular destinations 1740, which each include links for further information.

Figure 18B:
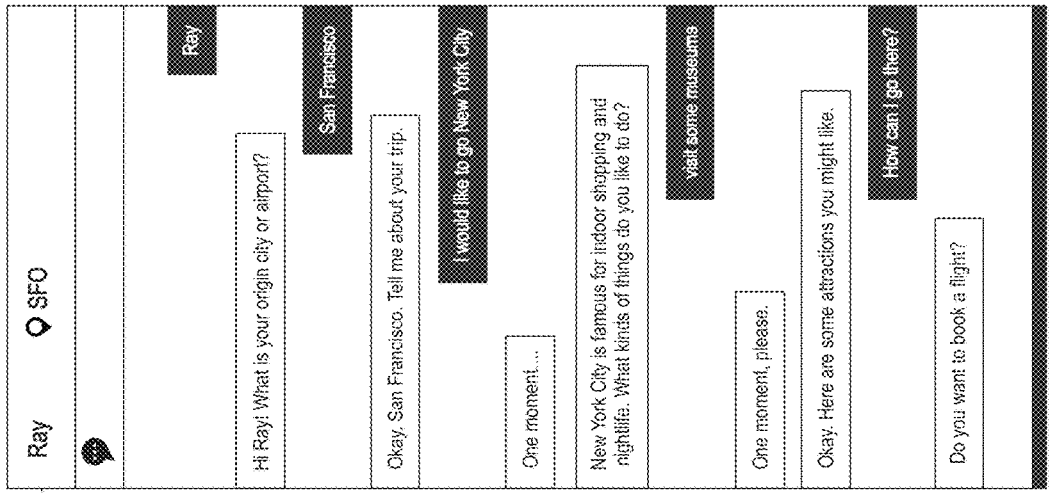
FIG. 18B illustrates an example conversation employing processing for next action prediction using graph theory and chat logs, according to one embodiment.
Figure 18A:
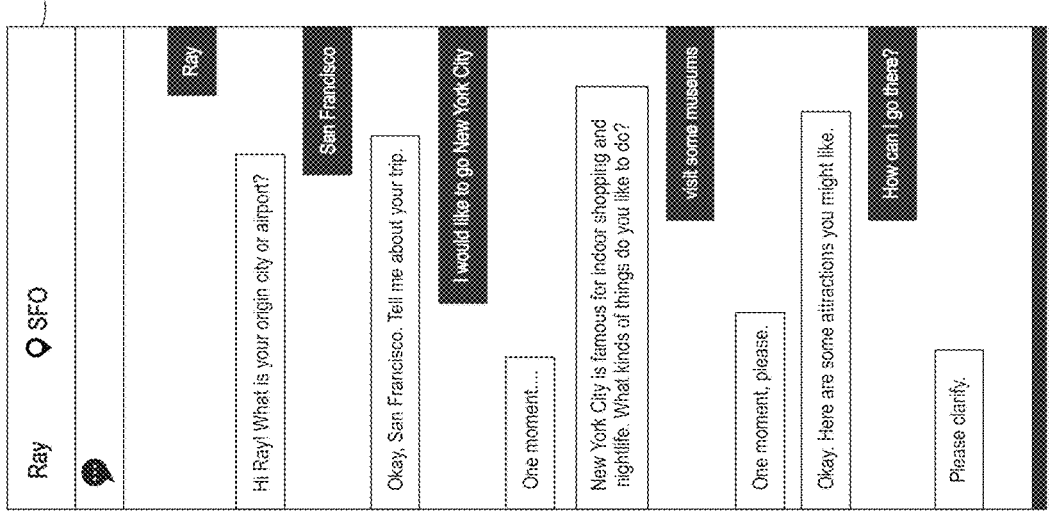
FIG. 18A illustrates an example conversation that results in a default output result.

FIG. 18A illustrates an example conversation 1810 that results in a default output result. In the conversation 1810, after the user replies to the virtual assistant or chatbot with "how can I go there," the virtual assistant or chatbot does not recognize the input and replies with the default "please clarify."

FIG. 18B illustrates an example conversation 1820 employing processing for next action prediction using graph theory and chat logs, according to one embodiment. In one embodiment, based on the next action prediction processing and use of a graph model, chat logs and optional user external context information, when the user inputs "how can I go there?" the virtual assistant or chat bot system (e.g., computing node 10, FIG. 1, processing system 300, FIG. 3, system 400, FIG. 4, system 500, FIG. 5, etc.) inserts a guiding message of "do you want to book a flight?"

In conventional virtual assistant or chatbot processing, the default rates are as high as 80% (e.g., Defaulted (Out-of-scope) 40%, defaulted (Off-topic) 40%) with recognized inputs about 20%. At least half of the "out-of-scope" user inputs (20%) can be avoided with robust repair methods, such as next action prediction and intervention according to one or more embodiments.

Figure 19:
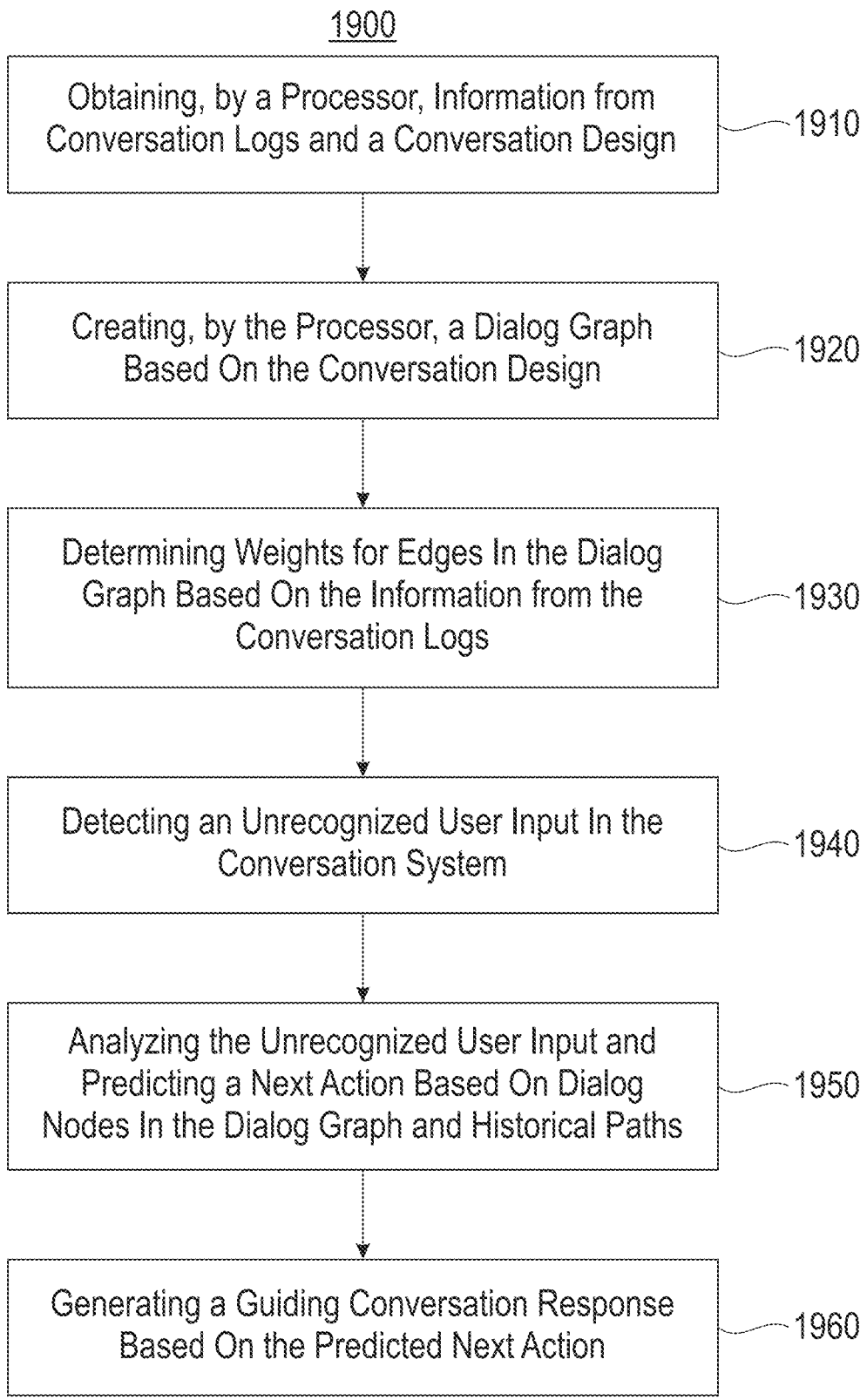
FIG. 19 illustrates a block diagram of a process for predicting next action in a conversation system, according to one embodiment.

FIG. 19 illustrates a block diagram for process 1900 for predicting next action in a conversation system (e.g., chatbot platform 1550, FIG. 15) based on graph theory, conversation logs (e.g., sequential chat logs, etc.) and external user context information, according to one embodiment. In block 1910, process 1900 obtains, by a processor (e.g., a processor from computing node 10, FIG. 1, processing system 300, FIG. 3, system 400, FIG. 4, system 500, FIG. 5, etc.), information from conversation logs and a conversation design. In block 1920, process 1900 provides for creating, by the processor, a dialog graph based on the conversation design. In block 1930, process 1900 provides for determining weights and attributes/logs for edges in the dialog graph based on the information from the conversation logs. In block 1940, process 1900 provides for detecting an unrecognized user input in the conversation system. In block 1950, process 1900 provides for analyzing the unrecognized user input and predicting a next action based on dialog nodes in the dialog graph and historical paths. In block 1960, process 1900 provides for generating a guiding conversation response based on the predicted next action.

In one embodiment, in process 1900 the conversation design includes all dialog node attributes and transition logics. In process 1900 a node in the dialog graph includes the dialog node and all its dialog node attributes. In process 1900 an edge in the dialog graph includes transition logic for any given dialog node pairs.

In one embodiment, in process 1900 the guiding conversation response is based on insertion of a temporary dialog node in the dialog graph. In one embodiment, in process 1900 determining weights for the edges includes: analyzing the conversation logs, calculating transition probabilities among dialog nodes of the dialog graph, and weighting the edges based on the transition probabilities. In one embodiment, determining the weights for the edges further includes adding user input and external context information to an edge attributes set.

In one embodiment, in process 1900 predicting the next action includes determining whether a match exists for a particular dialog node in the dialog graph and analyzing individual context information that includes: time, historical web page or mobile page visiting information, and location.

In one embodiment, process 1900 includes improving the conversation design upon non-acceptance of the guiding conversation response based on: analyzing historical records including exception records, issue records and prediction results; updating dialog nodes and conversation transition logics based on the historical records; and updating the dialog graph based on the updated dialog nodes and transition logics. In one embodiment, in process 1900 the conversation system is a virtual assistant, chatbot platform or application, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for predicting a next action in a conversation system comprising:
    obtaining, by a processor, information from conversation logs and a conversation design;
    creating, by the processor, a dialog graph based on the conversation design;
    determining weights for edges in the dialog graph based on the information from the conversation logs;
    detecting an unrecognized user input in the conversation system;
    analyzing the unrecognized user input and predicting a next action based on dialog nodes in the dialog graph and historical paths;
    generating a guiding conversation response based on the predicted next action; and
    improving the conversation design upon non-acceptance of the guiding conversation response based on analyzing historical records including exception records, issue records and prediction results, updating dialog nodes and conversation transition logics based on the historical records, and updating the dialog graph based on the updated dialog nodes and transition logics.

2. The method of claim 1, wherein:
    the conversation design comprises all dialog node attributes and transition logics;
    a node in the dialog graph comprises the dialog node and all its dialog node attributes; and
    an edge in the dialog graph comprises transition logic for any given dialog node pairs.

3. The method of claim 2, wherein the guiding conversation response is based on insertion of a temporary dialog node in the dialog graph.

4. The method of claim 3, wherein determining weights for the edges comprises:
    analyzing the conversation logs;
    calculating transition probabilities among dialog nodes of the dialog graph;
    weighting the edges based on the transition probabilities; and
    adding user input and external context information to an edge attributes set.

5. The method of claim 2, wherein predicting the next action comprises determining whether a match exists for a particular dialog node in the dialog graph.

6. The method of claim 2, wherein predicting the next action further comprises:

analyzing individual context information comprising: time, historical web page or mobile page visiting information, and location.

7. The method of claim 1, wherein the conversation system comprises a virtual assistant or chatbot application.

8. A computer program product for predicting a next action in a conversation system, the computer program product comprising a non-transitory computer readable storage medium having program instructions embodied therewith, the program instructions executable by a processor to cause the processor to:
- obtain, by the processor, information from conversation logs and a conversation design;
- create, by the processor, a dialog graph based on the conversation design;
- determine, by the processor, weights for edges in the dialog graph based on the information from the conversation logs;
- detect, by the processor, an unrecognized user input in the conversation system;
- analyze, by the processor, the unrecognized user input and predicting a next action based on dialog nodes in the dialog graph and historical paths;
- generate, by the processor, a guiding conversation response based on the predicted next action; and
- improve, by the processor, the conversation design upon non-acceptance of the guiding conversation response based on analyzing historical records including exception records, issue records and prediction results, update, by the processor, dialog nodes and conversation transition logics based on the historical records, and update, by the processor, the dialog graph based on the updated dialog nodes and transition logics.

9. The computer program product of claim 8, wherein:
- the conversation design comprises all dialog node attributes and transition logics;
- a node in the dialog graph comprises the dialog node and all its dialog node attributes; and
- an edge in the dialog graph comprises transition logic for any given dialog node pairs.

10. The computer program product of claim 9, wherein the guiding conversation response is based on insertion of a temporary dialog node in the dialog graph.

11. The computer program product of claim 10, wherein determining weights for the edges comprises:
- analyzing the conversation logs;
- calculating transition probabilities among dialog nodes of the dialog graph;
- weighting the edges based on the transition probabilities; and
- adding user input and external context information to an edge attributes set.

12. The computer program product of claim 9, wherein predicting the next action comprises determining whether a match exists for a particular dialog node in the dialog graph.

13. The computer program product of claim 9, wherein predicting the next action further comprises:
analyzing individual context information comprising: time, historical web page or mobile page visiting information, and location.

14. The computer program product of claim 8, wherein the conversation system comprises a virtual assistant or chatbot application.

15. An apparatus comprising:
a memory configured to store instructions; and
a processor configured to execute the instructions to:
- obtain information from conversation logs and a conversation design;
- create a dialog graph based on the conversation design;
- determine weights for edges in the dialog graph based on the information from the conversation logs;
- detect an unrecognized user input in a conversation system;
- analyze the unrecognized user input and predict a next action based on dialog nodes in the dialog graph and historical paths;
- generate a guiding conversation response based on the predicted next action; and
- improve the conversation design upon non-acceptance of the guiding conversation response based on analyzing historical records including exception records, issue records and prediction results, updating dialog nodes and conversation transition logics based on the historical records, and updating the dialog graph based on the updated dialog nodes and transition logics;
wherein the guiding conversation response is based on insertion of a temporary dialog node in the dialog graph.

16. The apparatus of claim 15, wherein:
- the conversation design comprises all dialog node attributes and transition logics;
- a node in the dialog graph comprises the dialog node and all its dialog node attributes; and
- an edge in the dialog graph comprises transition logic for any given dialog node pairs.

17. The apparatus of claim 16, wherein determining weights for the edges comprises:
- analyzing the conversation logs;
- calculating transition probabilities among dialog nodes of the dialog graph;
- weighting the edges based on the transition probabilities;
- adding user input and external context information to an edge attributes set; and
- predicting the next action comprises determining whether a match exists for a particular dialog node in the dialog graph, and analyzing individual context information comprising: time, historical web page or mobile page visiting information, and location.

18. The apparatus of claim 16, wherein the conversation system comprises a virtual assistant or chatbot application.

* * * * *